W. BOOTH.
Manufacture of Combs from Celluloid, &c.
No. 223,311. Patented Jan. 6, 1880.
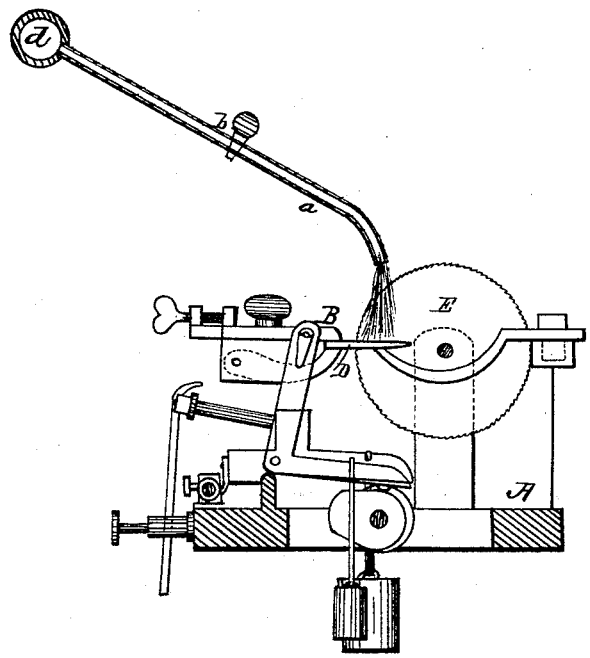
Witnesses:
Chas. E. Gill
J. P. Ryan
Inventor;
William Booth
By his Attys,
Cox and Cox

UNITED STATES PATENT OFFICE.

WILLIAM BOOTH, OF NEWARK, NEW JERSEY, ASSIGNOR TO THE CELLULOID MANUFACTURING COMPANY, OF NEW YORK, N. Y.

MANUFACTURE OF COMBS FROM CELLULOID, &c.

SPECIFICATION forming part of Letters Patent No. 223,311, dated January 6, 1880.

Application filed October 24, 1879.

*To all whom it may concern:*

Be it known that I, WILLIAM BOOTH, of Newark, in the county of Essex and State of New Jersey, have invented a new and useful Improvement in the Manufacture of Combs from Celluloid and Analogous Material, of which the following is a specification, reference being had to the accompanying drawing.

The invention relates to the manufacture of combs from celluloid and analogous material.

It consists in a process wherein a stream or jet of water is applied upon the saw or in proximity thereto on the comb-blank during the operation of the saw, as hereinafter more fully set forth.

In the manufacture of combs from celluloid and analogous material the blank is mounted upon a carriage, which is regularly advanced at given intervals to a circular saw, by which the spaces between the teeth are, one after the other, cut. It has generally been found that the action of the saw will bend to one side or irregularly cut the teeth of the comb to a greater or less extent, and very frequently cause the comb-blank to ignite. Much inconvenience, too, has been caused by the gumming up of the teeth of the saw, which occasions loss of time and annoyance. To obviate these and other difficulties oil and other liquids and substances have been used upon the saw, and also upon the comb-blank, but without effecting a satisfactory result. By the means hereinafter described, however, they are all effectually overcome and an improved result accomplished.

The simplicity of my invention is such that little difficulty will be experienced in understanding and practicing it.

By preference, a circular or other saw of any desired construction is mounted in any convenient way, and adjacent thereto, so arranged and in such a position that it will deliver a continuous stream or jet of water about the point where the saw enters the comb-blank or upon the saw, a delivery-cock is placed, from which the stream or jet of water is permitted to flow without interruption during the operation of the saw.

In the accompanying drawing is shown a device which I have operated with satisfactory results, and which is illustrative of the invention.

A denotes the frame of the machine; B, the device carrying the comb-blank D, and E the circular saw, directly above which is the delivery-pipe *a*, having a cock, *b*. The pipe *a* is an arm extending from the water-supply pipe *d*, arranged in rear of the machine.

The pipe *d* is simply one of a series of pipes supplying the house with water, and may be arranged in any convenient manner. It is essential, however, that the delivery-pipe *a* be so placed that water flowing from it will fall upon or near the teeth of the circular saw E.

It is plain that the adjustment and construction of the device whereby the stream or jet of water is delivered may be varied at will, according to circumstances. It is of the utmost importance that the action of the stream or jet of water be continuous and uninterrupted during the entire period of sawing, as any discontinuance will inevitably cause the teeth to bend and become irregular to a greater or less extent. Care will be taken, accordingly, to so arrange and adjust the devices employed that the stream or jet of water will never be separated to any considerable extent from the teeth of the cutting mechanism.

I contemplate the use of a saw, but do not limit myself to any particular construction or form of saw.

What I claim as my invention, and desire to secure by Letters Patent, is—

1. The process of making combs of celluloid and analogous material herein set forth, consisting in the application of a stream or jet of water to or near the saw while the teeth of the comb are being cut, substantially as set forth.

2. The process of making combs of celluloid or analogous material herein set forth, in which a jet or stream of water is applied to or near the saw while the teeth of the comb are being cut, substantially as set forth.

In testimony that I claim the foregoing improvement in the manufacture of combs from celluloid and analogous material, as above described, I have hereunto set my hand this 27th day of September, 1879.

WILLIAM BOOTH.

Witnesses:
WM. BRO. SMITH,
CHAS. C. GILL.